G. Nock

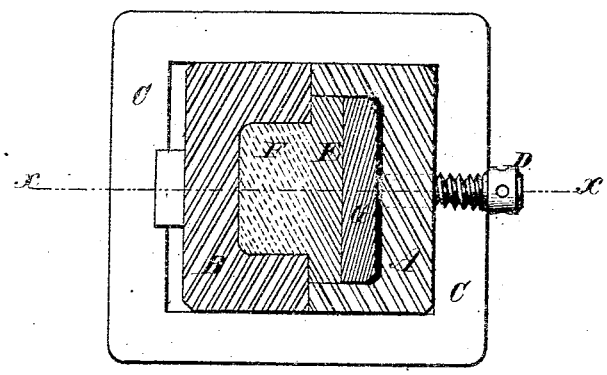
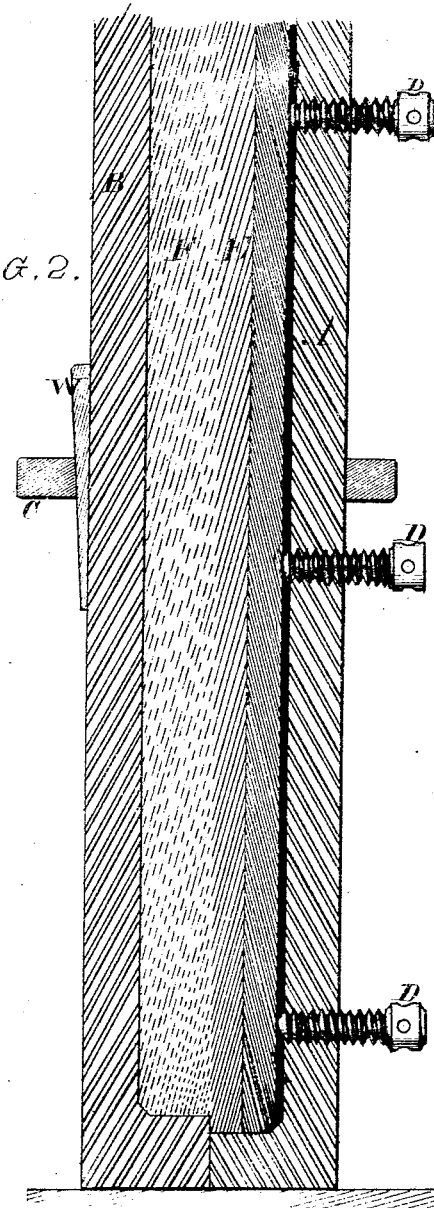

Mould For Welding Steel To Iron

No. 96,469        Pat. Nov. 2, 1869.

2 Sheets—Sheet 2.

W. B. Deming
Fred'k M. Klauche
Witnesses

Geo. Nock

UNITED STATES PATENT OFFICE.

GEORGE NOCK, OF NEW MONMOUTH, NEW JERSEY, ASSIGNOR TO HIMSELF AND ZADOK STREET, OF SALEM, OHIO.

IMPROVEMENT IN MOLDS FOR WELDING STEEL TO IRON.

Specification forming part of Letters Patent No. 96,469, dated November 2, 1869.

*To all whom it may concern:*

Be it known that I, GEORGE NOCK, of New Monmouth, in the county of Monmouth and State of New Jersey, have invented a new and useful Process and Apparatus for Welding Steel to Iron, of which the following is a description.

My invention consists, first, in an efficient and economical mode of welding steel and iron in the act of casting the former; and, secondly, in a new construction of mold and other means and appliances for carrying the process into effect.

In applying my invention I preferably employ a mold or flask made in two parts, the cavity in one being wider than that in the other. A suitable forging of iron is placed in the wider part of the mold, at a welding heat, and tightly clamped and pressed by means of set-screws or other appliances. The molten steel is then immediately poured into the narrower part of the mold, and becomes perfectly united to the iron over the entire surface, where they come in contact, and immediately after introducing the steel additional pressure may be applied, if desired, to condense the steel as it sets, and to force the two metals into more intimate union. I propose by this process to produce steel-capped rails, either by casting the steel in finished form upon an iron bar, which has been previously forged or rolled into proper shape for the base and body of the rail, so that the structure will come out of the mold in the form of a finished steel-capped rail, or else to cast steel upon iron by the same process and appliances to form compound iron and steal blooms or piles, perfectly welded together, to be used for rolling steel-capped or steel-faced bars or rails for railways or other purposes.

My invention further consists in forming the iron forging on which the steel is to be cast with an irregular or dovetailed surface, or punching holes therein for the reception of the molten steel, in order to form a more secure connection between them.

My invention also consists in welding steel in the mold, by the process hereinbefore set forth, to iron slabs, plates, or bars, which may afterward be welded to iron bars by the customary process of welding iron to iron, producing a perfect steel-capped iron pile, which can then be shaped for the purpose intended as a common iron pile or bloom, the steel drawing on one side and the iron on the other. A steel-capped iron-forging of any shape and dimension may thus be produced with great facility without an expensive flux.

Figure 3:
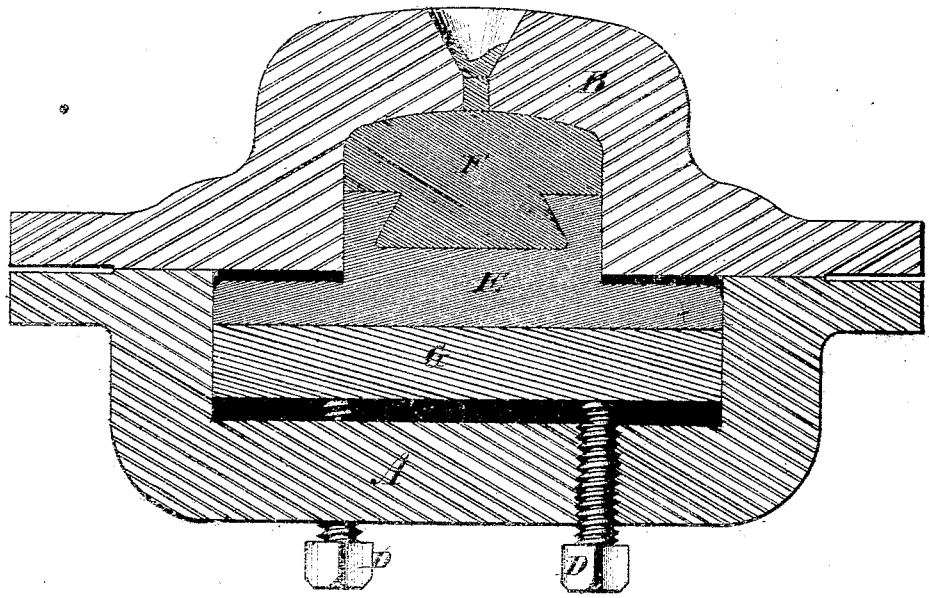
Figure 4:
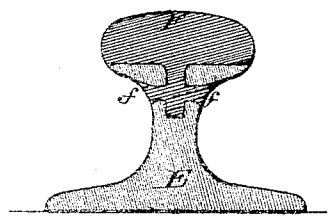
Figure 5:
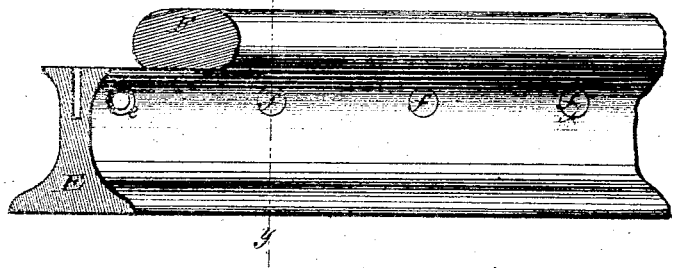
Figure 6:
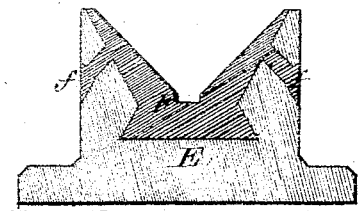
Figure 7:
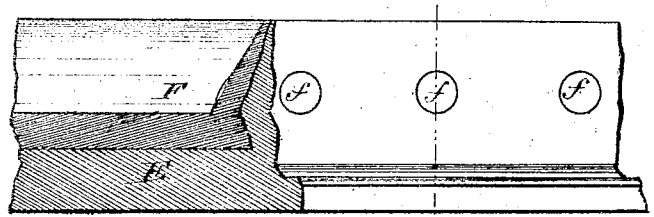

Figure 1 represents a horizontal section at $x\ x$, Fig. 2, of the preferred form of the mold. Fig. 2 is a vertical section of the same. Fig. 3 represents a transverse section of a mold of modified form, with an iron forging secured therein and a steel cap cast upon its upper surface. Fig. 4 is a transverse section at $y\ y$, Fig. 5, of a steel-capped railroad-rail made according to my invention. Fig. 5 is a perspective view of the same, the iron body being represented as projecting beyond the steel cap, so as to more clearly represent the shape of the former. Fig. 6 is a transverse section at $z\ z$, Fig. 7, of a steel-capped or steel-faced slide for steam-engines or for other purposes. Fig. 7 is a sectional perspective view of the same.

Similar letters of reference indicate corresponding parts in the several views.

A and B represent two parts of a mold, held together by a clamp, C, and wedge W, or by other suitable device. The cavity in the part A is of greater width than that in the part B, so that when a forging, E, of wrought-iron, is fitted at welding-heat into A, and the latter clamped upon B, the forging E will fit tightly around the margin of the member B and leave the cavity therein, ready for the reception of the molten steel F, which, being poured in at the top, becomes perfectly welded to the face of the iron E.

As an additional means of pressing the hot iron in the member A of the mold against the face of B, set-screws D D may be employed, a follower, G, being interposed between said screws and the hot iron. When the follower and set-screws are dispensed with, the entire cavity in A will be filled with the iron, and in either case the said cavity can of course be made of any necessary depth to accommodate the forging to which the steel is to be applied.

If preferred, the apparatus may be used in the manner illustrated in Fig. 3, so as to not only clamp the iron in the mold, but by means of the screws D to compress the steel, too, while the latter is cooling. The dovetail connection (shown in Fig. 3) forms a stronger bond between the iron and steel, and the structure made as represented in the drawings constitutes a suitable bloom or pile from which to roll a steel-capped rail. In Figs. 4 and 5 are represented a steel-capped rail, as it may be finished directly within the mold, E being the base of the rail, forged or rolled, of iron, and F the steel cap cast thereon by the process above described.

$c$, Fig. 3, are apertures in the iron E, to receive the tongue of steel which will pass into the said apertures as the steel is poured in, either with or without pressure.

The production of steel-capped rails for railways by this improved process and apparatus constitutes a very important part of my invention.

Figs. 6 and 7 illustrate the application of the invention to the production of slides to steam-engines, or for other purposes. This is another valuable use of the process, but is only given as an illustration, it being deemed needless to enumerate the many objects to which it may be profitably applied.

Blooms or ingots of iron and steel may be combined by the process above described, either for rolling or forging, or for the welding of the iron surface to other structures of iron, preliminary to rolling or forging the whole into any desired shape. The position of the steel causes it to be protected by the iron, so as to avoid danger of burning when the heat is applied to the iron surface for welding, forging, and rolling.

I claim as my invention—

1. The mold herein described, provided with screws D D, or their equivalent, for pressing the iron slab against the face of the mold, or against the steel itself, all substantially as set forth.

2. The devices herein described, whereby compound-iron and steel slabs for railway-rails and other uses are produced by confining the iron within the mold and welding the steel to it in the act of casting, with screws D D, or their equivalent, for applying pressure to the iron, as set forth.

To the above specification of my process and apparatus for welding steel to iron I have signed my hand this 29th day of September, 1869.

GEORGE NOCK.

Witnesses:
OCTAVIUS KNIGHT,
ZADOK H. STREET.